INVENTOR.
LOUIS S. WAIT

United States Patent Office 3,129,765
Patented Apr. 21, 1964

3,129,765
EXPLOSIVE ACTUATED VALVE FOR
PRESSURIZED RECEPTACLES
Louis S. Wait, Encino, Calif., assignor, by mesne assignments, to American Radiator & Standard Sanitary Corporation, New York, N.Y., a corporation of Delaware
Filed June 18, 1962, Ser. No. 203,401
2 Claims. (Cl. 169—9)

This invention generally relates to pressurized containers tanks and other types of receptacles, and means for positively retaining and yet quickly and effectively discharging pressurized fluid therefrom, particularly in cases of emergency operations. More specifically, the invention is directed to an improved explosive actuated valve assembly for use in conjunction with a pressurized receptacle.

Although the invention, as indicated, has usefulness in many diverse applications, it will be described in the present specification from the standpoint of its employment with fire extinguishers. It will be apparent to those skilled in the art, however, that certain features of the present invention may be used in almost all applications in which a pressurized fluid must be released from a conduit or container in response to a certain given condition, and whereby a remotely actuated explosive valve unit may be employed.

The present invention is a continuation-in-part of applicant's previous application for explosive Actuated Valve for Pressurized Receptacle, filed November 8, 1960, under Serial No. 68,057, now abandoned. The present invention similarly embodies certain features and characteristics enabling it to substantially conform with military specifications for example, as set forth in MIL–C–6386 (USAF) and MIL–C–22284 (WEP). Thus, the improved explosive actuated valve of the present invention is designed for operation on six to thirty volts D.-C. Also, as will be hereafter evident, the unit may be made of relatively light, easily fabricated components which may be assembled and disassembled without the requirement of special tools. The construction is such that no critical fits or clearances must be maintained, and yet the unit has excellent proven reliability as tested under extreme environmental testing conditions.

Considering the foregoing factors, the primary object of the present invention is to provide an improved explosively actuated valve assembly for use with a pressurized vessel in which the valve assembly is fabricated, as indicated heretofore, of relatively simple components without the need of critical fits or clearances to be maintained.

Another object of the present invention is to provide an improved explosively actuated valve assembly for pressurized receptacles which is rugged and reliable, and yet in which the valve assembly meets rigid military specifications and is relatively light weight so that it may be advantageously employed in aircraft applications.

Still another object of the present invention is to provide an improved explosively actuated valve assembly for use with a pressurized receptacle, in which the valve assembly is constructed such that non-skilled workmen cannot inadvertently assemble the unit without including all essential components. More particularly, the assembly is constructed such that all essential parts must be included in order to complete the final assembly. As a consequence, when properly assembled, the operator of the aircraft may be assured that the unit is in condition for operation.

Still a further object of the present invention is to provide an improved explosively actuated valve assembly for use with a pressurized receptacle wherein the valve assembly is so constructed that substantially no leakage occurs under pressures as high as 2600 p.s.i., and yet in which the valve unit may be broken apart under emergency conditions with a minimum amount of explosive and with minimum damage to the permanent components thereof.

Another object of the present invention is to provide an improved explosively actuated valve assembly, which may be readily recharged with a new squib unit with a minimum amount of effort and time and with no possibility of inadvertent misassembly.

These and other objects and advantages of the present invention are generally achieved by providing a receptacle for pressurized fluid having an outlet passage which is designed to receive an explosive actuated normally closed valve unit interposed therein.

More particularly, the features of the present invention relate to a combination including a stopper plug sealably closing off the outlet passage and support means rigidly coupled to the receptacle. The support means are so positioned and constructed as to bias the plug into its sealing relationship with the receptacle. Furthermore, the support means includes a frangible annular member or structure proximate the stopper plug.

In connection with another feature of the invention, electrically actuated cartridge means or squib means are receivable into the support means. The squib mans are so designed as to integrally include electrical terminals thereon for connection to a source of electrical power.

In operation, upon actuation of the squib means, the frangible portion of the support means is broken to in turn release the force against the stopper plug and allow the fluid to escape from the receptacle.

It is important to note that the electrical connecting means are included as a part of the squib means such that it is impossible to connect the valve assembly to an electrical source of power without having the explosive frangible structure embodied in the unit.

A better understanding of these and other features of the present invention will be had by reference to the accompanying drawings, showing merely one illustrative embodiment, and in which.

Figures 1, 2, 3:
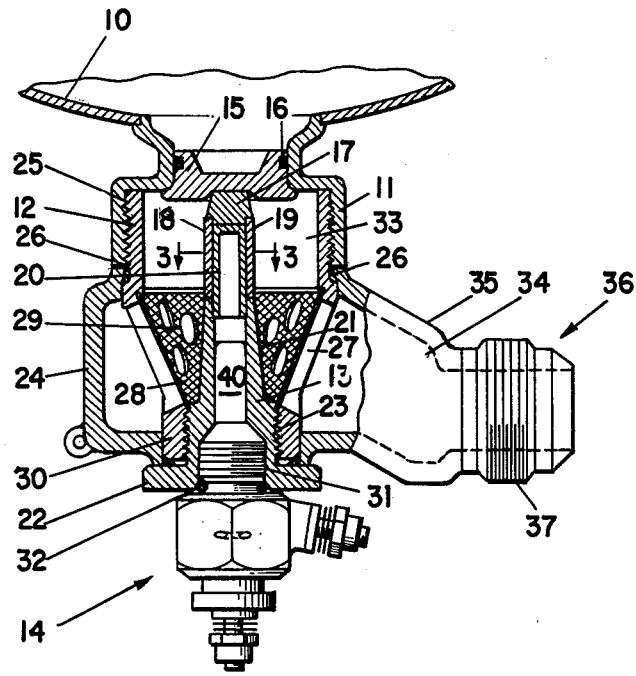
FIGURE 1 is a sectional view of the improved valve assembly of the present invention.
FIGURE 2 is an enlarged view of the squib or electrically actuated cartridge embodied in the valve assembly of FIGURE 1; and, FIGURE 3 is a sectional view taken in the direction of the arrows 3—3 of FIGURE 1.

Referring now to the drawings, there is shown in FIGURE 1 a receptacle or container 10 which is designed to receive a pressurized fluid, for example, a fire extinguishing agent. The receptacle 10 has welded thereto a fitting 11 which is designed to threadingly receive, as hereafter described, an annular member 12. The annular member 12 is in turn constructed to retain a squib housing 13 by a threaded connection, and the squib housing 13 couples by threaded connection a squib 14. The housing 13 also supports a stopper plug 15. The detailed structure and function of each of these components will now be described.

The plug 15 is provided with an annular seal 16 such that it will close off and seal the pressurized fluid within the container 10 from escape through the fitting 11.

The plug 15 is retained and biased towards its seated positioned by a bearing member 17 which is in turn supported by opposing semi-cylindrical split bushings 18 and 19 retained about a thin case member 20. The case member 20 is in the form of an inverse drawn cup-shaped structure and has positioned thereabout the bushings 18 and 19, while the bearing member 17 positioned thereover. This structure is perhaps more clearly understood by reference to FIGURE 3.

In actual manufacture, the bearing member 17, split bushings 18 and 19, and the inner case member 20 are assembled together with an epoxy resin to form a unitary frangible structure. The epoxy structure is thereafter supported upon the squib housing 13 which includes a tapered end portion 21. The squib housing 13 includes a nut member 22 and a lower threaded portion 23 for threading the squib housing into coupled relationship with the annular member 12 as hereafter described. In this regard, it is to be noted that there is positioned between the nut 22 of the squib housing 13 and the fitting 11 a swivel member 24 to be hereafter further described.

The annular member 12, as heretofore mentioned, is threaded at 25 to the fitting 11 and is sealed thereto and with respect to the swivel member 24 by an annular seal 26. The annular member 12 is provided with a plurality of windows or openings 27 in its intermediate portion and further embodies a frusto-conical screen structure 28. The screen structure 28 is also provided with openings 29 through which gas may pass and thereafter flow radially outwardly through the windows 27. The annular member 12 further defines a lower end portion 30, which, as heretofore mentioned, is threadingly coupled to the portion 23 of the squib housing 13.

The squib 14, as such, is threaded at 31 into the squib housing 13 and is sealed thereto with an annular seal 32.

The further structural details of the explosively actuated valve assembly of the present invention may be more clearly understood by a description of its assembly and operation.

The container or extinguisher tank may be of the configuration shown in applicant's co-pending application heretofore referred to. The tank may be provided with the welded fitting 11 (heretofore described) for purposes of accommodating the valve assembly of the present invention.

In assembly, the plug 15 and seal member 16 are first positioned in place while the tank is inverted and in its unpressurized state. Also, the frangible structure consisting of the bushings 18, 19, casing 20, and bearing 17 may be positioned in place in the bottom of plug 15 within what may be termed an explosive chamber 33. Thereafter, the annular member 12 is threaded at 25 into the fitting 11 while the plug 15 and frangible structure remain in position by gravity. With the member 12 and the fitting 11 assembled together, the swivel member 24 may then be placed in position and the latter rotated to its desired direction as required for the particular application. Thereafter, the squib housing 22 is threaded at 23 into the lower end 30 of the member 12.

It will be noted that the nut 22 of the squib housing 13 not only functions to support the frangible epoxy structure, but that it also serves to orient the swivel structure 24 in the proper direction. Thus, the windows 27 open to an outlet passage 34 communicating through an arm 35 provided with a fitting 36 at its free end. The fitting 36 may include threading 37 for connecting the latter to a conduit or line leading to the area where fire may occur or is to be guarded against, e.g., an aircraft engine nacelle.

The parts heretofore described form the permanent components of the improved valve assembly under normal operation.

The squib unit 14 may then be threaded with its seal 32 at 31 into the lower end 23 of the squib housing. It will be appreciated that as soon as the valve 15 is forced away from its sealing position, the pressurized gases within the container 10 will flow through the explosive chamber 33 and thereafter through the outlet passage 34 and connected line to the particular area where fire extinguishing agents may be required as previously mentioned.

As will be seen in the view of FIGURE 2, the squib 14 includes an explosive cap or cartridge 40 which may embody explosive material, and the squib is further provided with electrical terminals 38 and 39 for connection to a source of electrical power to actuate the explosive material in the cap 40 to fracture same. In a preferred construction, the ground terminal is indicated at 38 and the "hot" or actuating terminal at 39.

In operation, in response to a fire condition, the terminal 39 is electrically connected to in turn cause explosion of the cap 40. Such explosion will, in turn, cause gas to escape into the cup 20 to break same and force the split bushing members 18 and 19 radially outwardly thereby eliminating support of the bearing member 17 and in turn the stopper plug 15.

The stopper plug 15, bearing 17, fractured casing 20 and split bushings 18 and 19 will then be forced outwardly and downwardly to rest over the top edge of the tapered end 21 of the squib support 13 or within the confines of the screen member 28 retained in the annular member 12. These expendable members, however, are not designed to be of sufficient dimensions to in any way possibly interfere with the escape of gases through the openings 29 in the screen member and the windows 27 in the annular member 12. The gases, in consequence, will then flow around the inner periphery of the swivel member 24 from the explosive chamber 33 into the outlet passage 34 and through the fitting 36 into the connected fire extinguishing line (not shown).

It will be appreciated that an important feature of the present invention resides in the fact that the squib unit 14 integrally includes electrical connections 38 and 39 as well as the explosive charge 40 such that if the squib unit is removed, no electrical connections may be made to the unit. Thus, as distinguished from other conventional constructions, final assembly of the improved explosively actuated valve assembly of the present invention cannot be made unless the squib member is inserted with its explosive charge. As a consequence, no possible misassembly may be made whereby electrical connections are made but no explosive charge is disposed within the unit.

Furthermore, it will be evident that by making various squib units include proper standardized threading 31, many different types of charges may be used with different external electrical connections 38 and 39 if desired. In other words, the explosive charge and electrical connecting portion of the valve assembly are integrally a separate replaceable item.

Also, it will be evident that the frangible assembly as such is a separate unit which may be replaced after being exploded with another like frangible assembly.

In actual operation, the charge 40 is so constructed that instead of a sudden explosion occurring, a sudden expansion of gases takes place which expands the cup 20 and the bushings 18 and 19 outwardly but in relatively slow motion as compared to conventional units. This type of operation limits damage to the permanent components while assuring positive and reliable operation.

It will be appreciated that many changes and modifications may be made to the explosively actuated valve assembly of the present invention without departing from the basic spirit and scope of the invention as set forth in the following claims.

What is claimed is:

1. The combination with a vesel for pressurized fluid, of an explosively-operated, valve structure comprising:
   (a) a fitting secured to said pressure vessel and including a reduced neck portion forming a cylindrical valve-sealing surface and an enlarged internally screw-threaded portion;
   (b) a tubular member including an enlarged end screw-threaded into said screw-threaded portion, a conical perforated intermediate portion, and a reduced internally screw-threaded extended end;
   (c) a hollow swivel member having coaxial spaced apertures sealingly engaging said tubular member adjacent said fitting and adjacent said extended end, and a laterally directed outlet;
   (d) a squib housing screw-threaded into the extended end of said tubular member and including a flange for retaining said swivel member on said tubular member, and a rupturable extremity directed toward said fitting within said tubular member;

(e) a valve disk sealingly engaging the sealing surface within said fitting and retained therein by said rupturable end, said valve disk being substantially smaller than the enlarged end of said tubular member;

(f) and an explosive charge with said squib housing operable to destroy said rupturable end, whereby pressure fluid in said tank forces said valve disk into the perforated intermediate portion of said tubular member for retention therein, and to permit free flow of said fluid through said laterally directed outlet.

2. The combination with a vessel for pressurized fluid, of an explosively-operated valve structure comprising:

(a) means forming a valve chamber having a reduced valve seat end attached to said vessel, a reduced extended end, and an enlarged and perforated intermediate portion;

(b) a hollow swivel member sealingly embracing said perforated portion and having a lateral outlet;

(c) a valve disk for said valve seat of substantially smaller diameter than said intermediate portion;

(d) a retaining means extending into said chamber-forming means and initially engageable with said valve disk to seal said valve seat, said retaining means being rupturable into relatively large fragments for retention in said perforated portion;

(e) and an explosive means for destroying said rupturable retaining means, whereby said presure fluid forces said disk valve into the enlarged portion of said chamber to permit free flow of said fluid from said pressure vessel through said chamber and swivel member to said outlet.

References Cited in the file of this patent

UNITED STATES PATENTS

| | | |
|---|---|---|
| 2,712,881 | Mathisen | July 12, 1955 |
| 2,938,529 | Olson | May 31, 1960 |